(12) United States Patent
Aoyama

(10) Patent No.: US 6,483,536 B2
(45) Date of Patent: Nov. 19, 2002

(54) DISTANCE MEASURING APPARATUS AND METHOD EMPLOYING TWO IMAGE TAKING DEVICES HAVING DIFFERENT MEASUREMENT ACCURACY

(75) Inventor: Chiaki Aoyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,432

(22) Filed: Nov. 2, 2001

(65) Prior Publication Data

US 2002/0060783 A1 May 23, 2002

(30) Foreign Application Priority Data

Nov. 17, 2000 (JP) .......................................... 2000-351867

(51) Int. Cl.[7] ............................. H04N 7/18; H04N 9/47; B25J 19/00; G01C 3/00; G01C 3/08; G01C 5/00; G01N 21/86; G01V 8/00
(52) U.S. Cl. ......................... 348/139; 901/47; 356/3.01; 250/559.31
(58) Field of Search ................................ 356/3.01–3.09; 901/47; 250/559.31, 559.33; 348/139

(56) References Cited

U.S. PATENT DOCUMENTS

| | | | | |
|---|---|---|---|---|
| 4,937,445 A | * | 6/1990 | Leong et al. | 250/237 G |
| 4,957,369 A | * | 9/1990 | Antonsson | 356/3.08 |
| 5,307,151 A | * | 4/1994 | Hof et al. | 33/200 |
| 5,374,985 A | * | 12/1994 | Beadles et al. | 356/3.11 |
| 5,386,285 A | * | 1/1995 | Asayama | 180/169 |
| 5,760,415 A | * | 6/1998 | Hauck et al. | 250/559.31 |
| 5,812,269 A | * | 9/1998 | Svetkoff et al. | 250/559.23 |
| 6,137,577 A | | 10/2000 | Woodworth | |

FOREIGN PATENT DOCUMENTS

| | | |
|---|---|---|
| JP | A61-265510 | 11/1986 |
| JP | A6-265320 | 9/1994 |
| JP | A6-265321 | 9/1994 |
| JP | A7-174537 | 7/1995 |
| JP | A7-174538 | 7/1995 |
| JP | A7-174553 | 7/1995 |

\* cited by examiner

*Primary Examiner*—Thomas H. Tarcza
*Assistant Examiner*—Brian Andrea
(74) *Attorney, Agent, or Firm*—Birch, Stewart, Kolasch & Birch, LLP

(57) ABSTRACT

A distance measuring apparatus is disclosed, which measures the entire image of a target object by employing a light-section method within a short time, without assigning any specific feature to light beams having a beam form obtained by passing through slits. The apparatus comprises a device for simultaneously emitting such light beams; first and second image taking devices for taking an image obtained by light reflected by the target object, where the distance between the first image taking device and the beam emitting device is relatively short while the distance between the first image taking device and the beam emitting device is relatively long; a section for estimating the distance to the target object based on the image taken by the first image taking device; and a section for determining the distance based on the estimated result and on the image taken by the second image taking device.

14 Claims, 6 Drawing Sheets

DISTANCE MEASURING APPARATUS AND METHOD EMPLOYING TWO IMAGE TAKING DEVICES HAVING DIFFERENT MEASUREMENT ACCURACY

BACKGROUND OF THE INVENTION

1. Field of the Invention

The present invention relates to a distance measuring apparatus and to a method for measuring a distance from the apparatus to an object by emitting light which passes through a slit, taking an image obtained by light reflected by the object, and referring to a positional relationship between the light emitting position and the image taking position.

2. Description of the Related Art

Recently, CCD cameras and computer image processing techniques have been improved, and accordingly, three-dimensional measurement methods using images have become common. An example of such three-dimensional measurement methods using a CCD camera and the computer image processing is a light-section method. In the light-section method, a light beam passing through a slit or having a beam form obtained by passing through a slit is projected onto a target object to be measured, so as to virtually cut the object using a band-shaped light and a cut surface is observed in a direction other than the direction of the projected light beam. Here, owing to the laser technique, very fine and intense light beams can be obtained. Therefore, even an object having an irregular surface can be measured at high speed and with high accuracy by employing the three-dimensional measurement method using the light-section method.

More specifically, in the light-section method, a light beam which passes through a slit and is emitted from a unit (i.e., distance measuring apparatus) which has a CCD camera is reflected by a surface of a target object, and an image obtained by the reflected light is taken by the CCD camera. The distance between the target object and the unit is measured based on the direction of the emitted beam and the positions of the relevant light source and the CCD camera. Therefore, in order to measure the entire portion of the target object, the light beam which passes through the slit is gradually shifted on the surface of the target object, and an image obtained by the reflected light is taken every time the light beam is shifted.

This method of taking images while shifting the light beam which passed through a slit requires a long measurement time for measuring the entire portion of an object. In order to solve this problem, a plurality of light beams which pass through slits may be emitted from the distance measuring apparatus. In this case, the shift of the light beam on the target surface is unnecessary, and the entire image of the target object can be measured through a single image-taking process. In this method, some of the light beams passing through slits may be ineffective for taking an image. Therefore, in order to specify the ineffective light beams, a specific beam width, pattern, or color is assigned to each light beam, so as to identify the light beam which was used for taking each image.

However, when a floor surface or an obstacle on a floor surface is detected using the light-section method as an optical sensor of a self-controlled robot, the distance towards the target object and the shape of the target object are unknown. Therefore, if a specific width, pattern, or color is assigned to each light beam and images are taken using reflected light beams, a large burden is imposed on the image processing. Additionally, in order to specify each of a plurality of light beams which pass through slits and have different color, a color image taken by a color camera must be processed; thus, the equipment cost is high and a bigger burden is imposed on the complicated color-image processing, and as a result, the processing time is increased. Furthermore, a device for emitting light beams which pass through slits must have a complicated mechanism for assigning a specific width, pattern, or color to each beam.

SUMMARY OF THE INVENTION

In consideration of the above circumstances, an object of the present invention is to provide a distance measuring apparatus and method for measuring the entire image of a target object by employing a light-section method with a short measurement time, without assigning any specific feature to light beams having a beam form obtained by passing through slits.

Therefore, the present invention provides a distance measuring apparatus for measuring a distance to a target object by using a light-section method, comprising:
  a beam emitting device for simultaneously emitting a plurality of light beams towards the target object, each beam having a beam form obtained by passing through a slit;
  a first image taking device for taking an image obtained by light reflected by the target object, where the distance between the first image taking device and the beam emitting device is relatively short so as to obtain a wide distance area;
  a second image taking device for taking an image obtained by light reflected by the target object, where the distance between the first image taking device and the beam emitting device is relatively long so as to obtain a high measurement accuracy of the distance;
  a distance estimating section for estimating the distance to the target object based on the image taken by the first image taking device; and
  a distance determining section for determining the distance to the target object based on the estimated result output from the distance estimating section and on the image taken by the second image taking device.

Preferably, the beam emitting device is positioned between the first image taking device and the second image taking device.

Typically, the beam emitting device includes a diffraction grating for obtaining said plurality of light beams.

Also typically, said plurality of light beams are laser beams.

The beam emitting device may include a beam diffusing element for diffusing a beam in a single plane so as to have said beam form.

Typically, the beam diffusing element has a cylindrical lens.

Typically, each of the first image taking device and the second image taking device comprises an interlaced scanning CCD camera.

The present invention also provides a self-controlled robot having a distance measuring apparatus as explained above.

Typically, the self-controlled robot is a bipedal robot having two legs.

In the self-controlled robot, it is possible that:
  the distance estimating section has a section for estimating the height of the target object based on the image taken by the first image taking device; and the self-controlled robot comprises an action plan determining section for determining an action plan of the robot based on the estimated result output from the distance estimating section; and the distance determining section has a section for determining a landing position of a leg of the robot based on the action plan, the estimated result output from the distance estimating section, and the image taken by the second image taking section.

The present invention also provides a distance measuring method of measuring a distance to a target object by using a light-section method, comprising:

a beam emitting step of simultaneously emitting a plurality of light beams towards the target object, each beam having a beam form obtained by passing through a slit;

a first image taking step of taking an image obtained by light reflected by the target object, where the distance between the point where the image is taken and the position where the beams are emitted is relatively short so as to obtain a wide distance area;

a second image taking step of taking an image obtained by light reflected by the target object, where the distance between the point where the image is taken and the position where the beams are emitted is relatively long so as to obtain a high measurement accuracy of the distance;

a distance estimating step of estimating the distance to the target object based on the image taken in the first image taking step; and a distance determining step of determining the distance to the target object based on the estimated result obtained in the distance estimating step and on the image taken in the second image taking step.

Typically, in the method, the position where the beams are emitted is positioned between the point where the image is taken in the first image taking step and the point where the image is taken in the second image taking step.

Preferably, the beam emitting step includes a beam diffusing step of diffusing a beam in a single plane so as to have said beam form.

According to the present invention, a plurality of light beams, each beam having a beam form obtained by passing through a slit, are simultaneously emitted, rough estimation of the distance is performed based on the image taken by the first image taking device, and the distance is determined using the image taken by the second image taking device with reference to the estimated results. Therefore, in a target area, highly accurate measurement of the distance is possible within a short measurement time. In addition, the above plurality of light beams can be generated using a single light source (i.e., beam emitting device); therefore, no color image is necessary, and image data taken by non-color cameras whose brightness data are known or obtained are processed. In addition, the above plurality of light beams can be generated using the diffraction grating and the beam diffusing element such as a cylindrical lens; thus, the structure of the beam emitting device (typically, laser light source) can be simplified.

DESCRIPTION OF THE PREFERRED EMBODIMENTS

Hereinafter, the distance measuring apparatus as an embodiment according to the present invention will be explained in detail with reference to the drawings.

Figure 3:
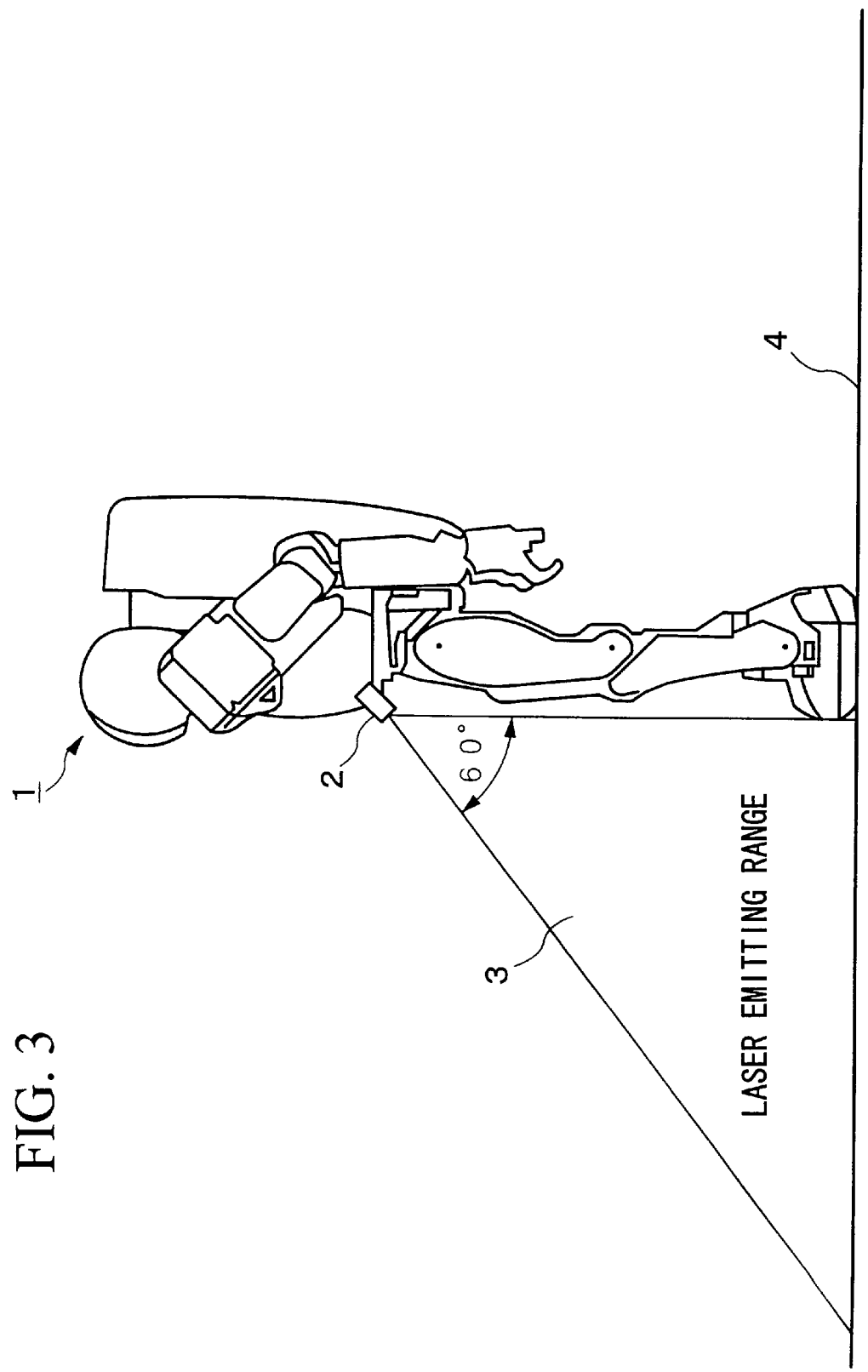
FIG. 3 is a diagram showing the appearance of the bipedal robot 1.

First, with reference to FIG. 3, a bipedal (i.e., two-legged) robot to which the distance measuring apparatus is attached will be explained. In FIG. 3, reference numeral 1 indicates a self-controlled bipedal robot (abbreviated to "robot", hereinbelow), and reference numeral 2 indicates an optical unit of the distance measuring apparatus, which is attached at the height of the waist portion of the robot 1. Reference numeral 3 indicates a laser emitting range of the optical unit 2 of the distance measuring apparatus. Here, the laser beam having a beam form obtained by passing through a slit (called a "slit" light beam, hereinbelow) is spread over 60 degrees in a single plane and the spread beam is emitted towards a floor surface 4. In addition, the set of the optical unit 2 is arranged so that the "slit" laser beam is emitted onto a forward area from a tip of a foot of the robot 1.

Figure 1:
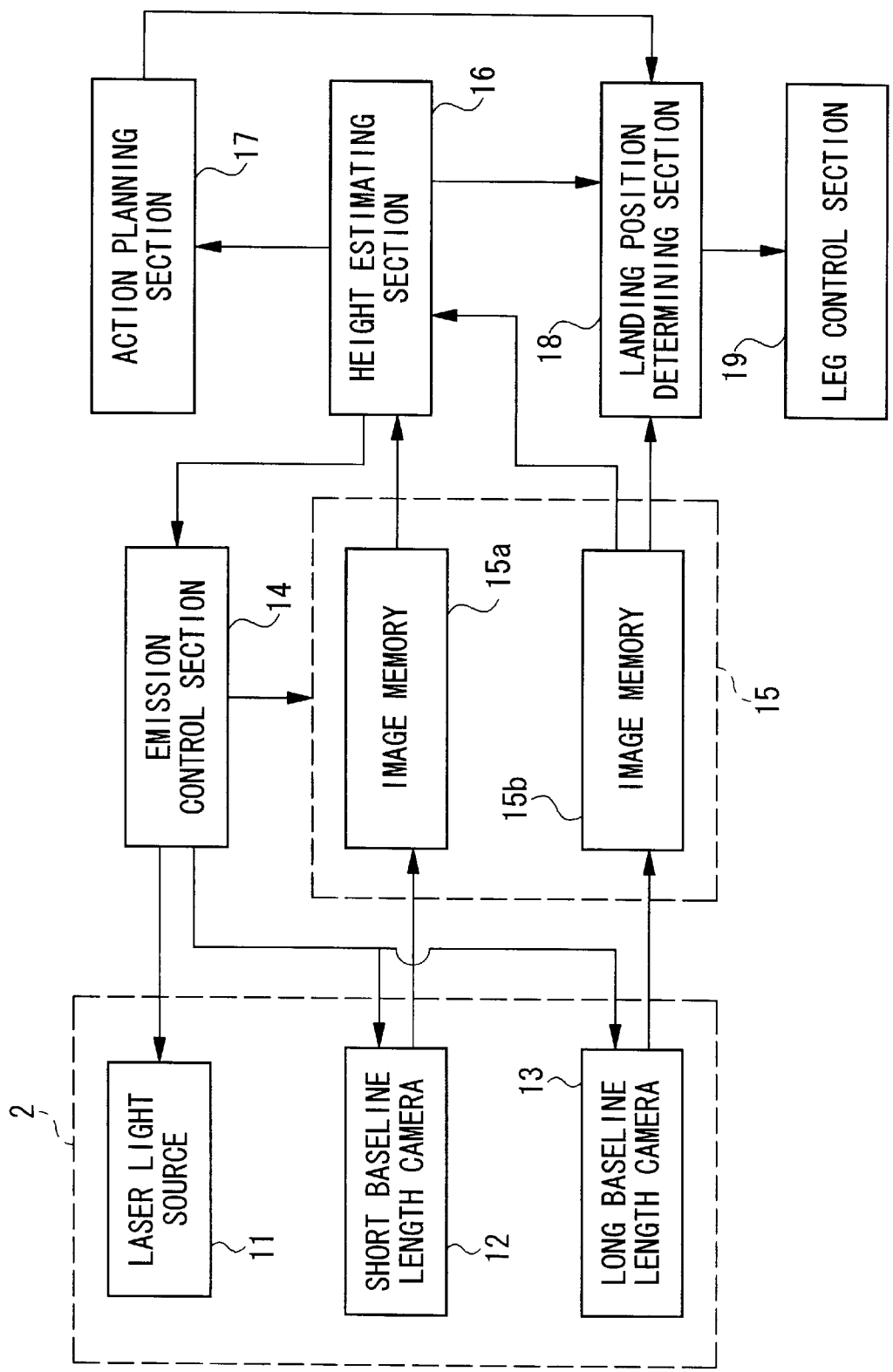
FIG. 1 is a block diagram showing the structure of an embodiment according to the present invention.

FIG. 1 is a block diagram showing the structure of the distance measuring apparatus of the present embodiment. In the figure, reference numeral 11 indicates a laser light source for;emitting a laser beam towards a target object, reference numeral 12 indicates a short baseline length camera arranged close to the laser light source 11, that is, the distance between the laser light source and the camera 12 is short. The short baseline length camera 12 comprises an interlaced scanning CCD camera and has a short baseline length. Therefore, this short baseline length camera has a low accuracy for measuring distance; however, a large distance range in front of the robot 1 can be observed by the camera 12. Reference numeral 13 indicates a long baseline length camera arranged away from the laser light source 11, that is, the distance between the laser light source and the camera is long. The long baseline length camera 13 also comprises an interlaced scanning CCD camera but has a long baseline length. Therefore, this long baseline length camera 13 has a high accuracy for measuring distance; however, the distance range in front of the robot 1 is limited for this camera 13. In addition, the short baseline length camera 12 and the long baseline length camera 13 can be operated using a synchronizing signal input from an external device.

Reference numeral 2 indicates the optical unit shown in the above-explained FIG. 3, and the optical unit 2 includes the laser light source 11, the short baseline length camera 12, and the long baseline length camera 13. Reference numeral 14 indicates an emission control section for outputting an emission control signal used for controlling the emission of the laser beam, and outputting a vertical synchronizing signal to the short baseline length camera 12 and the long baseline length camera 13. Reference numeral 15 indicates an image storing section having two image memories 15a and 15b for storing image signals (i.e., image data) output from the above two cameras. That is, the image storing section 15 respectively stores data of images taken by the short baseline length camera 12 and the long baseline length camera 13 in the image memories 15a and 15b.

Reference numeral 16 indicates a height estimating section for estimating the height of the target object based on the image data obtained by the short baseline length camera 12 and stored in the image memory 15a.

Reference numeral 17 indicates an action planning section for determining an action plan of the robot 1, based on the estimated results (output from the height estimating section) related to the target object. Here, the "action plan" means to determine, in advance, the action of the robot 1 in determination of its path of movement, based on the height of the target object estimated by the height estimating section 16, more specifically, to determine whether the obstacle will be avoided when the robot advances, whether the robot will step over the obstacle, or the like.

Reference numeral 18 indicates a landing position determining section for determining how to raise a leg of the robot and where the foot of the raised leg will land, based on the action plan determined by the action planning section 17 and the height of the target object estimated by the height estimating section 16.

Reference numeral 19 indicates a leg control section for controlling a section for driving the legs of the robot so as to land the foot of the relevant leg on the landing position determined by the landing position determining section 18.

Next, with reference to FIG. 2, the detailed structure of the laser light source 11 in FIG. 1 will be explained.

Figure 2:
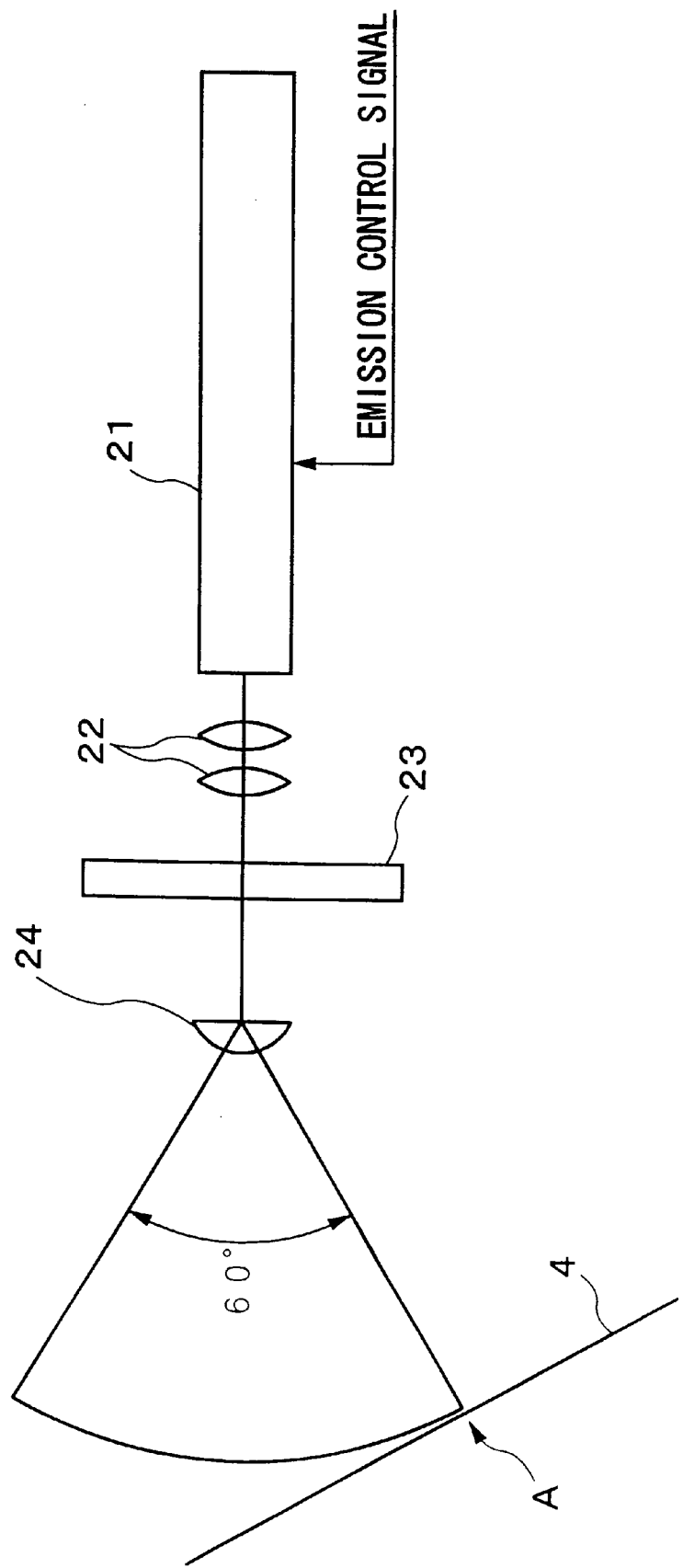
FIG. 2 is a block diagram showing the structure of the laser light source 11 in FIG. 1.

FIG. 2 is a block diagram showing the structure of the laser light source 11. In the figure, reference numeral 21 indicates a laser beam emitting section. Reference numeral 22 indicates a condenser lens for condensing the laser beam emitted from the laser beam emitting section 21, so as to obtain a condensed beam. Reference numeral 23 indicates a diffraction grating for dividing the laser beam condensed through the condenser lens 22 into a plurality of beams. Here, the divided beams are aligned in the direction perpendicular to the plane of FIG. 2. Reference numeral 24 indicates a beam diffusing lens using a cylindrical lens or the like. This beam diffusing lens is provided for diffusing each laser beam in a single plane so as to generate a beam having a beam form obtained by passing through a slit. That is, each beam is diffused by the beam diffusing lens 24 at a diffusion angle of 60 degrees, as shown in FIG. 2.

In addition, in FIG. 2, reference numeral 4 indicates a floor surface, and reference symbol A indicates a point (on the floor) where a tip of a (front) foot of the robot 1 is present.

Figure 4:
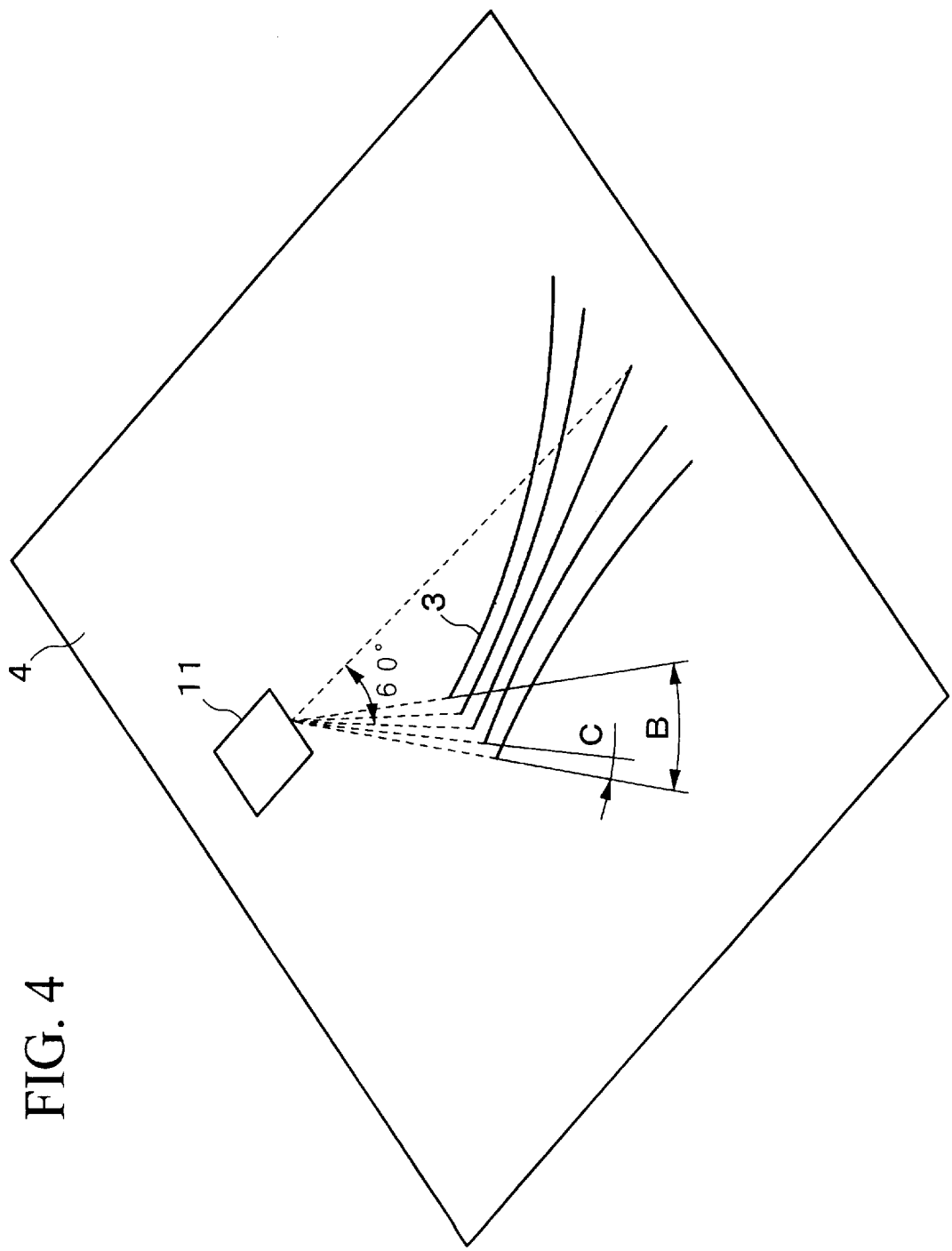
FIG. 4 is a diagram showing a state in which the laser beam is emitted from the optical system 2.

The optical system 2 is attached to the height of the waist of robot 1, and FIG. 4 shows a state in which the laser beam is emitted under the above mounting condition. In FIG. 4, reference numeral 11 indicates the laser light source. Reference numeral 3 indicates a laser emitting range obtained by the laser emitted by the laser light source 11 onto the floor surface 4. Here, the emitted laser beam is divided into five beams by the diffraction grating 23, and each beam is diffused by 60 degrees through the beam diffusing lens 24. These laser beams are emitted towards the floor surface 4, and images obtained by the beams reflected by the floor surface are taken by the short baseline length camera 12 and the long baseline length camera 13. Here, in the example of FIG. 4, the emitted laser beam is divided into five beams for convenience of explanations. However, in a practical example, angle B in FIG. 4 is 32 degrees and angle C is 1.6 degrees. Accordingly, the number of divided beams is 21 in this case.

Next, with reference to FIGS. 5 and 6, the operation of the measurement will be explained.

Figure 5:
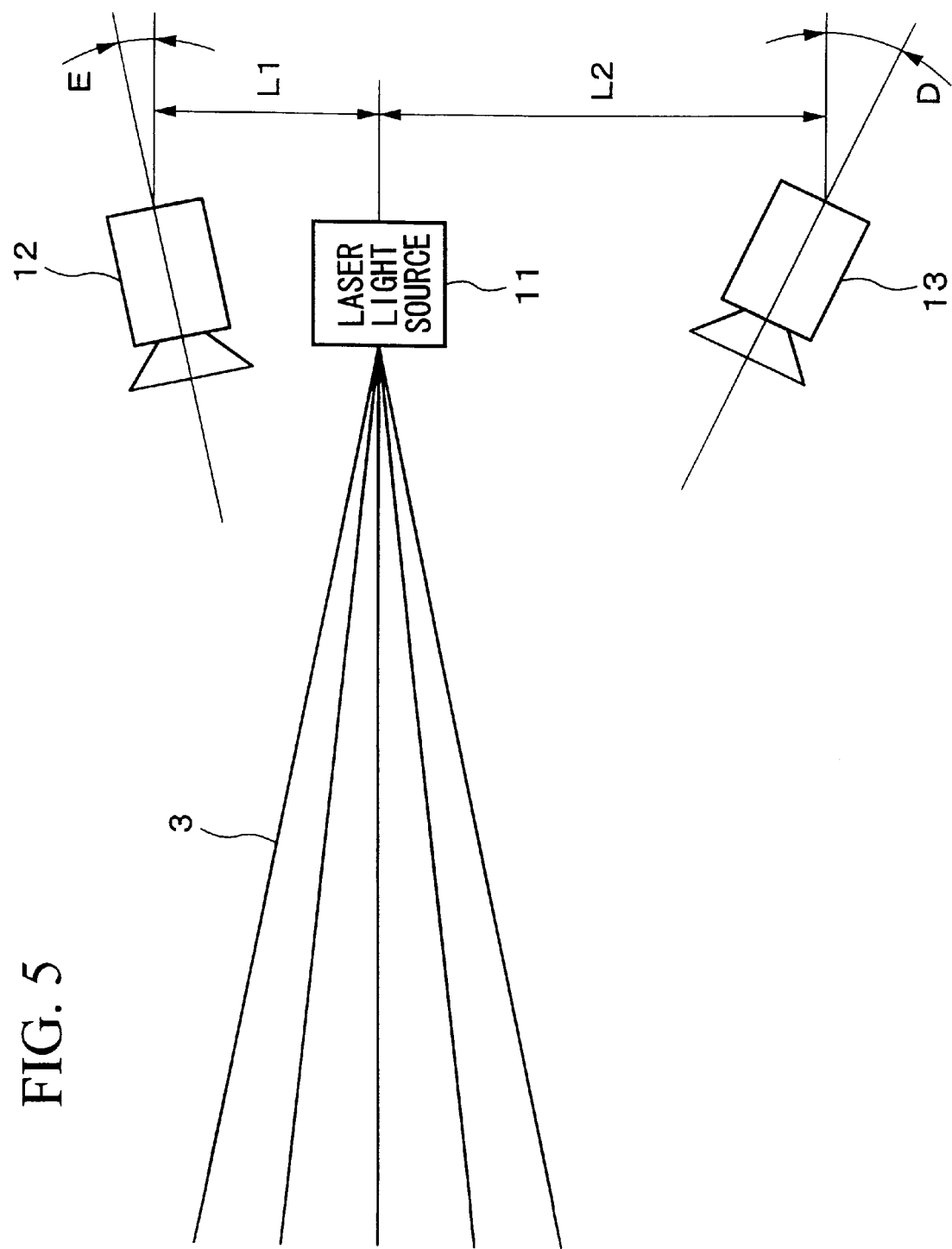
FIG. 5 is a diagram showing a positional relationship between the laser light source 11, the short, baseline length camera 12, and the long baseline length camera 13.
Figure 6:
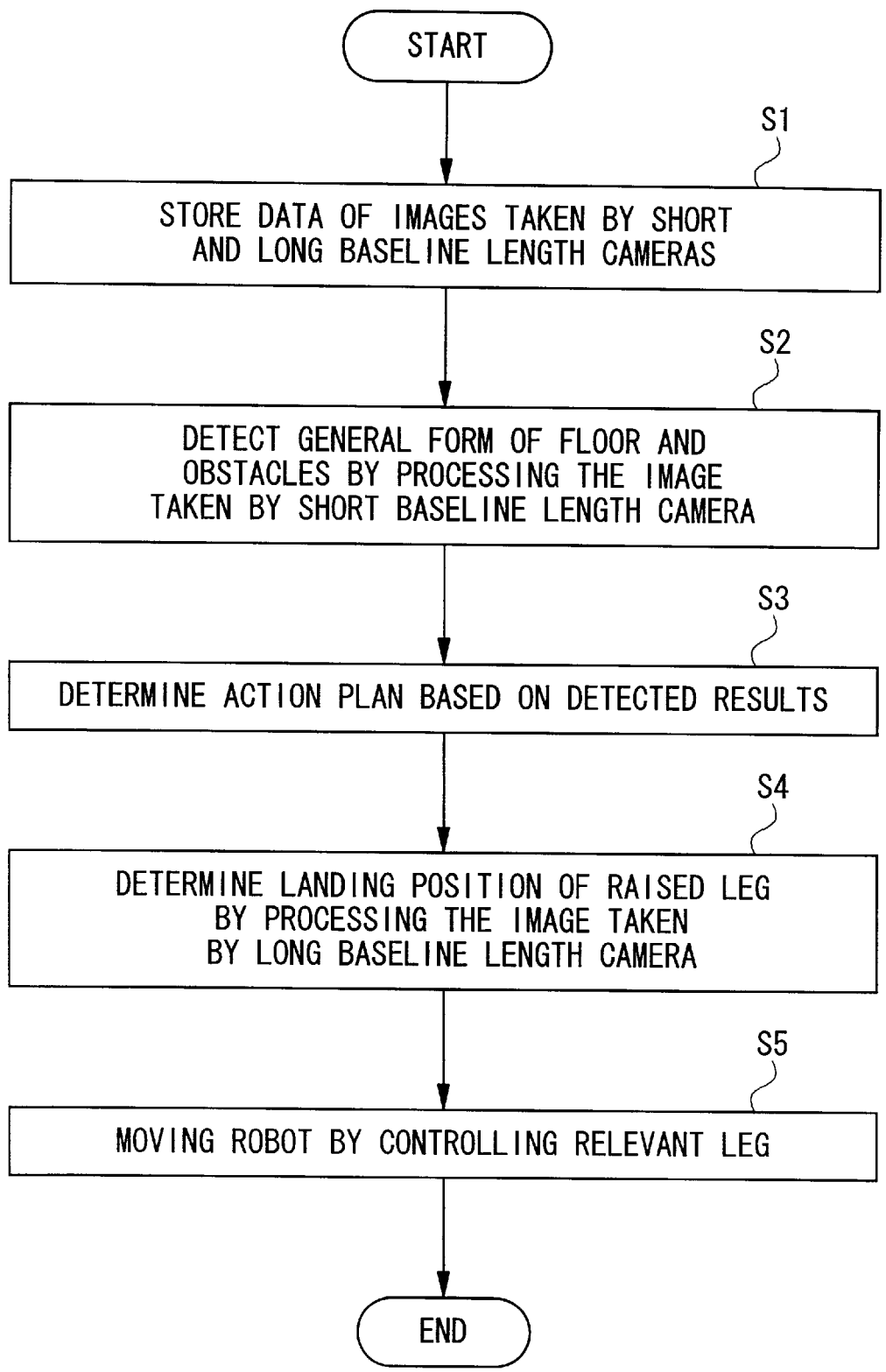
FIG. 6 is a flowchart showing the operation of the distance measurement.

FIG. 5 is a diagram showing a positional relationship between the laser light source 11, the short baseline length camera 12, and the long baseline length camera 13. Reference numeral 31 indicates a laser emitting range. Here, in order to make the figure easy to understand, only five beams are shown. Reference symbol L1 indicates the baseline length of the short baseline length camera 12, and reference symbol L2 indicates the baseline length of the long baseline length camera 13. The baseline length indicates the distance between the laser emitting position and the image-taking position using the reflected light of the emitted laser beam. The long baseline length camera 13 is positioned such that the baseline length of this camera 13 is longer than the baseline length of the short baseline length camera 12.

Generally, in the light-section method, distance is determined using the principle of triangulation. In triangulation, a triangle is defined by connecting two reference points (whose positions are known) and any other third point, and the position of the third point is determined by measuring the angles of the triangle. According to the principle, the longer the distance between the known two points (which corresponds to the baseline length), the higher the accuracy of the measured distance.

As shown in FIG. 5, as the baseline length L2 increases, angle D for determining the set (i.e., orientation) of the long baseline length camera 13 must be larger so as to properly take an image obtained by the reflected light of the "slit" light beam. However, the combination of the long baseline length L2 and the large angle D makes the discrimination between each "slit" beam difficult.

On the other hand, for a shorter baseline length L1, angle E for determining the set (i.e., orientation) of the short baseline length camera 12 can be smaller. Therefore, the possible measurement range of the distance can be longer and each "slit" light beam can be easily discriminated. However, due to the above-explained reason, the accuracy of the measurement of the distance is lower in this case.

In the present invention, only advantageous features among the above features are used in order to accurately measure the distance and to control the walking action of the robot 1. That is, objects are first measured in a broad range of distances by using the short baseline length camera 12 having a lower accuracy of the distance measurement, and after this rough estimation of the distance, the distance to each target object is determined by using the long baseline length camera 13 having a higher accuracy of distance, measurement.

This operation will be explained with reference to FIG. 6. FIG. 6 is a flowchart showing the operation of the distance measurement.

In the first step S1, the image storing section 15 receives images taken by the short baseline length camera 12 and the long baseline length camera 13 and respectively stores these images. in the image memories 15a and 15b.

In the next step S2, the height estimating section 16 processes the data of the image taken by the short baseline length camera 12, that is, the image data stored in the image memory 15a, and detects the general form of the floor and obstacles on the floor. This detection is performed by determining the distance to each pixel which received the reflected light of the "slit" beam, based on the principle of triangulation.

In the next step S3, the action planning section 17 determines the action plan of the robot 1 in consideration of the floor and obstacles detected by the height estimating section 16. In the action plan, specific actions are determined, such as "going around the right side of an obstacle", "going straight and halting just before stairs which will appear in the path and going up the stairs", or the like.

In the next step S4, the landing position determining section 18 determines the landing position of the raised leg of the robot 1, by processing the data of the image taken by the long baseline length camera 13, that is, the data stored in the image memory 15b. Here, the landing position is determined with reference to the action plan and the results of obstacle detection performed by the height estimating section 16. In order to determine the landing position, the stepping direction of the legs of robot 1, the height of the raised leg, and the stride of the robot 1 must be determined, and in order to determine these parameters, distance data measured with high accuracy is necessary. Therefore, the data of the image taken by the long baseline length camera 13 is used. Accordingly, the accurate landing position of the raised leg can be determined. Additionally, even if some of the "slit" light beams are ineffective for taking an image, the general form of the floor and the obstacles are detected by referring to the image taken by the short baseline length camera 12. Therefore, the images taken by the long baseline length camera 13 through the "slit" light beams can be effectively used for improving the measurement accuracy of the distance.

In the next. step S5, the leg control section 19 controls a drive section for driving the legs of the robot 1 so as to land the foot of the relevant leg at the landing position determined by the landing position determining section 18.

As explained above, a plurality of light beams, each having a shape of a beam which passes through a slit, are simultaneously emitted, rough estimation of the distance is performed based on the image taken by the short baseline length camera 12, and the distance is determined using the image taken by the long baseline length camera 13 with reference to the estimated results. Therefore, in a target area, highly accurate measurement of the distance is possible. In addition, the above plurality of light beams can be generated using a single light source (i.e., laser beam emitting section 21); therefore, no color image is necessary, and image data taken by non-color cameras whose brightness data are known or obtained are processed. In addition, the above plurality of light beams are generated using the diffraction grating 23 and beam diffusing lens 24; thus, the structure of the laser light source 11 can be simplified.

The baseline length L1 in FIG. 5 is defined to be as short as possible as long as the distance (measurement) accuracy necessary for planning the action plan can be obtained. The angle E is defined to be as small as possible as long as the measurement area necessary for planning the action plan can be observed by the cameras used, that is, within the angle of view of the cameras.

The baseline length L2 in FIG. 5 can be of a length necessary for determining the landing position of the leg of the robot 1. The angle D can be of an angle necessary for observing an area determined based on the maximum stride of the robot 1.

In addition, a stereoscopic image may be generated by processing the two images taken by the two cameras. In this case, a distance image is generated based on the stereoscopic image processing, and this distance image is used for determining the landing position. Accordingly, the accuracy for determining the measured distance can be further improved.

Additionally, the laser light source 11 is positioned between the short baseline length camera 12 and the long baseline length camera 13. Therefore, the images obtained by the emitted "slit" beams can be efficiently taken.

What is claimed is:

1. A distance measuring apparatus for measuring a distance to a target object by using a light-section method, comprising:
    a beam emitting device for simultaneously emitting a plurality of light beams towards the target object, each beam having a beam form obtained by passing through a slit;
    a first image taking device for taking an image obtained by light reflected by the target object, where the distance between the first image taking device and the beam emitting device is relatively short so as to obtain a wide distance area;
    a second image taking device for taking an image obtained by light reflected by the target object, where the distance between the second image taking device and the beam emitting device is relatively long so as to obtain a high measurement accuracy of the distance;
    a distance estimating section for estimating the distance to the target object based on the image taken by the first image taking device; and
    a distance determining section for determining the distance to the target object based on the estimated result output from the distance estimating section and on the image taken by the second image taking device.

2. A distance measuring apparatus as claimed in claim 1, wherein the beam emitting device is positioned between the first image taking device and the second image taking device.

3. A distance measuring apparatus as claimed in claim 1, wherein the beam emitting device includes a diffraction grating for obtaining said plurality of light beams.

4. A distance measuring apparatus as claimed in claim 1, wherein said plurality of light beams are laser beams.

5. A distance measuring apparatus as claimed in claim 1, wherein the beam emitting device includes a beam diffusing element for diffusing a beam in a single plane so as to have said beam form.

6. A distance measuring apparatus as claimed in claim 5, wherein the beam diffusing element has a cylindrical lens.

7. A distance measuring apparatus as claimed in claim 1, wherein each of the first image taking device and the second image taking device comprises an interlaced scanning CCD camera.

8. A self-controlled robot having a distance measuring apparatus as claimed in claim 1.

9. A self-controlled robot as claimed in claim 8, wherein the self-controlled robot is a bipedal robot having two legs.

10. A self-controlled robot as claimed in claim 9, wherein:
    the distance estimating section has a section for estimating the height of the target object based on the image taken by the first image taking device; and
    the self-controlled robot comprises an action plan determining section for determining an action plan of the robot based on the estimated result output from the distance estimating section; and
    the distance determining section has a section for determining a landing position of a leg of the robot based on the action plan, the estimated result output from the distance estimating section, and the image taken by the second image taking section.

11. A distance measuring method of measuring a distance to a target object by using a light-section method, comprising:

a beam emitting step of simultaneously emitting a plurality of light beams towards the target object, each beam having a beam form obtained by passing through a slit;

a first image taking step of taking an image obtained by light reflected by the target object, where the distance between the point where the image is taken and the position where the beams are emitted is relatively short so as to obtain a wide distance area;

a second image taking step of taking an image obtained by light reflected by the target object, where the distance between the point where the image is taken and the position where the beams are emitted is relatively long so as to obtain a high measurement accuracy of the distance;

a distance estimating step of estimating the distance to the target object based on the image taken in the first image taking step; and a distance determining step of determining the distance to the target object based on the estimated result obtained in the distance estimating step and on the image taken in the second image taking step.

12. A distance measuring method as claimed in claim 11, wherein the position where the beams are emitted is positioned between the point where the image is taken in the first image taking step and the point where the image is taken in the second image taking step.

13. A distance measuring method as claimed in claim 11, wherein said plurality of light beams are laser beams.

14. A distance measuring method as claimed in claim 11, wherein the beam emitting step includes a beam diffusing step of diffusing a beam in a single plane so as to have said beam form.

* * * * *